United States Patent [19]

Cuvelier

[11] 4,211,528

[45] Jul. 8, 1980

[54] SOLUTIONS OF SUBLIMABLE DYES FOR THE PREPARATION OF SPECIAL INKS FOR FELT TIP MARKERS OR PENS

[75] Inventor: Georges Cuvelier, Lille, France

[73] Assignee: Dollfus-Mieg & Cie, Paris, France

[21] Appl. No.: 870,998

[22] Filed: Jan. 20, 1978

[30] Foreign Application Priority Data

Jan. 20, 1977 [FR] France .................. 77 01515

[51] Int. Cl.² ............... C09B 67/00; D06P 1/667
[52] U.S. Cl. ............................ 8/471; 106/22;
106/26; 260/13; 260/30.6 R; 260/33.8 R;
260/33.8 UA; 260/42.49; 260/42.54; 8/602;
8/584
[58] Field of Search ............ 8/2.5, 2.5 R, 2.5 A,
8/172, 85 R, 89, 171, 174; 260/551 P, 30.6 R,
33.8, 33.8 R, 33.8 U, 33.8 A, 13; 106/22, 26

[56] References Cited

U.S. PATENT DOCUMENTS

| 3,531,550 | 9/1970 | Herber et al. ............... 260/551 P |
| 3,792,968 | 2/1974 | Richenbacker et al. ............ 8/2.5 A |

*Primary Examiner*—J. Ziegler
*Attorney, Agent, or Firm*—Wenderoth, Lind & Ponack

[57] ABSTRACT

The object of the invention is a solution of one or more sublimable disperse dyestuffs in organic solvents. These solvents consist of at least one aliphatic hydrocarbon containing chlorine, mixed with a minor amount of hexamethylphosphorotriamide. The solutions according to the invention are particularly suitable for the manufacturing of felt tip markers or pens for decorating woven, non-woven or knitted materials by hot transfer.

3 Claims, No Drawings

SOLUTIONS OF SUBLIMABLE DYES FOR THE PREPARATION OF SPECIAL INKS FOR FELT TIP MARKERS OR PENS

The present invention relates to solutions of sublimable disperse dyes and to the preparation, using these solutions, of special inks with a view to manufacturing felt tip markers or pens for decorating woven, non-woven or knitted materials and fabrics or films of certain synthetic materials by hot transfer.

The use of sublimable dyes for dyeing or printing by hot transfer or by sublimation, as described for example in French Pat. Nos. 1,223,330 and 1,334,829 is well known. The solutions of sublimable dyes used as a base for preparing the special inks of the invention differ from the hitherto known solutions in that the dyes are adapted to the process of dyeing or printing by transfer or sublimation of the materials mentioned above.

It is known that transfer printing is carried out by printing a temporary flat support not having any affinity for the sublimable dyes by suitable means, and then contacting the support with the fabric and heating the combination dry at a temperature of between 120° and 250° C. The dye sublimes or migrates and then dissolves in the synthetic material.

Temporary supports that do not have any, or only a very slight affinity for the sublimable dyes are generally more or less pure cellulose papers, cellulose-based non-woven supports, cellulose films, or metal sheets of aluminium or another metal.

Synthetic materials that can be dyed by transfer or sublimation by means of sublimable dyes are for example secondary cellulose acetate, cellulose triacetate and, more generally, cellulose esters, polyesters, polyamides, acrylic or methacrylic polymers or copolymers, or mixtures of these materials with one another or with natural materials if the latter are in a minor proportion or have been specially treated to accept sublimable dyes.

The expression "sublimable dyes" used herein refers to dyes that have a high degree of 'bleeding' when tested basically according to the conditions laid down in French Standard NF-G07-063 of November 1972: Method for determining dry heat fastness (excluding ironing). According to this Standard the dyed material, placed between two white cloths one of which is made of polyester unless otherwise indicated, is brought into intimate contact for 30 seconds under a pressure of 4 kPa±0.2 kPa with heated plates or rollers maintained at a given temperature between 150° C.±2° C. and 210° C.±2° C. The standard NF G 07-063 is in technical agreement with the ISO/R 105/IV—1968, part 2, recommendation, as modified by the ISO/R 105/IV-/A₁amendment of 1972.

The sublimable dyes that give a positive result for this test, but for contact times of between 10 seconds and 1 minute and for pressure between 2 kPa and 40 kPa, may be employed within the scope of the invention.

The fact that the sublimable dye sublimes in the physical meaning of the expression or migrates into the cloth in a form other than gaseous is not essential. The fundamental point is that the dye passes from one substrate to the other and dyes the latter fast.

Suitable sublimable dyes correspond in general to those termed "disperse" or "plastosoluble" in the "Color Index", 1956 Edition, of the "Society of Dyers and Colourists", under the heading "Disperse Dyes".

Chemically, these dyes generally belong to one of the following classes:
anthraquinine dyes
azo dyes
quinophthalone dyes
nitroarylamine dyes
styryl dyes.

It is understood of course that the present description and claims refer, unless otherwise indicated, to pure dyestuffs without the addition of any auxiliary agents.

The Produits Chimiques Ugine Kuhlmann Company (P.C.U.K.) has classified sublimable disperse dyes into four classes (A.B.C.D.) as a function of their sublimation curves on a polyester.

These classes correspond to:
Class A: maximum tinctorial strength at a temperature below 200° C.
Class B: maximum tinctorial strength at a temperature of 200° to 210° C.
Class C: maximum tinctorial strength at a temperature of 210° to 225° C.
Class D: maximum tinctorial strength at a temperature above 225° C.

By the expression "tinctorial strength" is understood in the present context the visual intensity of the dye that has migrated into the permanent substrate.

Within the scope of the invention, in order to produce inks for felt tip markers or pens and avoid inhomogeneities during the transfers, disperse dyes from Classes B and C are preferred.

However, as their name implies, disperse dyes are insoluble or only slightly soluble in water and most of the conventional solvents, and consequently the inks normally used themselves consist of dispersions of fine particles of dyes in a medium in which they are insoluble. This requires very prolonged and careful grinding and pulverization, but even under these conditions these inks cannot be employed in felt tip markers or pens since the felt very quickly becomes clogged up with a deposit of dyes. Furthermore, the fibre pad acting as a reservoir reinforces still further this segregation action of the dye particles. In fountain pens, sediments and blockages occur, giving rise to difficulties in use and to variations in dye concentration during use.

Finally, in the dispersions the dye is in a crystalline state different from that which it is in when dissolved in the synthetic material, and as a consequence the colour of the temporary substrate is very different from that obtained after transfer. Great difficulty may therefore be experienced in making up samples.

In a previous patent application the Applicants have already proposed the use of a solution of disperse dyes in which the solvent consists of at least one liquid organic substance having at least one keto group and/or at least one ethylene glycol derivative having at least one ether group, these liquids having, in the case of a mixture, different boiling points, the solvent furthermore containing in the case where a higher dissolving power is desired, up to about 30% by volume of a diethylene glycol ether, a salicylic acid ester, benzyl alcohol, benzaldehyde, or a mixture of at least two of these solvents. However, the proportions of these solvents in the mixtures are difficult to regulate as a function of the number, nature and concentration of the dyes used, as well as their storage stability, desired drying rate, etc.

The object of the present invention is to eliminate these disadvantages and concerns, to this end, solutions of dyes characterised in that the solvent consists of at least one aliphatichydrocarbon having 1 to 3 carbon atoms and in which at least one hydrogen atom is replaced by a chlorine atom; and hexamethylphosphorotriamide is added in an amount of between 2 and 10% by weight to the said solvent.

The invention also concerns inks for felt tip markers and pens, characterised in that the said inks are obtained by incorporating soluble binders in the solutions defined above.

It has been found that in the case of chlorinated hydrocarbons that have a low solvent power of the order of 2 to 5 g/l with respect to disperse dyes, the said solvent power may be considerably increased up to values of 20 to 30 g/l and even 80 g/l for certain disperse dyes if 2 to 10% by weight, preferably 3 to 6% by weight, of hexamethylphosphorotriamide is added.

It has been found that, despite its high boiling point (98°–100° C. at a pressure of 8 mbars), hexamethylphosphorotriamide is absorbed by the support provided that its concentration in the mixture does not exceed 10%, and does not cause diffusion of the ink or produce 'rings' or the so-called 'greasy paper' effect.

Of the chlorinated hydrocarbons, the following have been selected, taking into account their solvent power, price and boiling point (b.p.)

| methylene chloride | b.p. 39.8° C. |
|---|---|
| chloroform | b.p. 61.2° C. |
| carbon tetrachloride | b.p. 76.7° C. |
| 1,1,1-trichloroethane | b.p. 74.1° C. |
| sym.-dichloroethane | b.p. 83.5° C. |
| trichloroethylene | b.p. 87.1° C. |
| perchloroethylene | b.p. 121.0° C. |
| 1,2,3-trichloropropane | b.p. 156.0° C. |

The colour of the dye solutions as defined above is similar to the colour after transfer, contrary to the case of the suspensions. One way of approximating the colour after transfer to be consists of making a spot on a paper and preserving the latter between two glass plates so as to prevent the solvents evaporating. The colour remains close to the real colour as long as the dye remains in solution.

Furthermore, it may be advantageous to use mixtures of chlorinated solvents having different boiling points. This prevents the felts drying too quickly when they are uncovered. Conversely, if the mixture contains a fairly volatile solvent, that is to say one having a boiling point below about 90° C., leakages or the greasy paper effect are prevented, and also the vapours can reimpregnate the felts when they have become too dry following accidental exposure while open or uncovered.

However, the addition of a binder is not necessary if the ink is to be used in felt tip markers or pens, though if it is desired to ensure a good dye behaviour on certain temporary supports or substrates such as metal foils, or films, and prevent dry dusting or powdering, it may be advantageous to use a binder. It is clear that this binder should be soluble in the mixture of solvents used. In addition, it should not have a high retention power for the disperse dyes, in other words it should only have a weak affinity for the latter, and it is advantageous if the binder does not melt, or has a 'sticking' temperature greater than the transfer temperature. Furthermore, in the case of inks for felt tip markers or pens, the binder must not increase the viscosity of the mixture too much; for a normal flow rate through the felt it is preferable if the viscosity of the solution remains below 20 cStoke.

This may be achieved by using binders of low molecular weight and by varing the amount of binder added.

It has been found that the following binders are entirely satisfactory: ethyl cellulose, preferably with a high degree of substitution and having a low viscosity, such as the ethyl celluloses N4, N7 or T10 prepared by the Hercules Company;
cellulose acetopropionate, such as CAP 504 OZ of the Eastman Chemical Int. Company;
ethylhydroxyethylcellulose, such as EHEC 75 of the Hercules Company;
chlorinated rubbers or chlorinated polypropylene, such as Parlon S or Parlon P of the Hercules Company;
colophane and its derivatives;
nitrocellulose.

For felt tip markers and pens, the various constituents should be inert with respect to the mixtures used. It has been found that pen bodies, caps and stoppers made of metal, polypropylene, aminoplast resins or phenoplast resins are very resistant to the solvents employed and are not coloured by the solutions of disperse dyes. Felt tips made of wool felt or compressed polyethylene, polyester or polyamide fibres are very resistant. The reservoir pads may advantageously be made of wool felts, or tufted felts of cotton, viscose, or cellulose fibres, either individually or as a mixture; they may consist of crepe paper rolls, or cotton, viscose, wool or linen wicks, the said rolls and wicks optionally being sheathed in a casing of polyethylene or cellophane.

As regards the disperse dyes, all the commerical grades of disperse dyes for transfer in the form of a powder preparation (anhydrous) for the solvent medium can be used. The following branded products that have been tried may be mentioned:

Catulia$^R$ powder of Produits Chimiques Ugine Kuhlmann
Resiren T$^R$ of the Bayer Company
Intratherm$^R$ of Crompton and Knowles International
Dispersol TP$^R$ of ICI Ltd
Transforon U$^R$ of Sandoz S.A. (for instance: Yellow Transforon U-3GL
C.I. Disperse Yellow 54), Red Transforon U-2BL (C.I. Disperse Red 60),
Pink Transforon U-5BL (C.I. Disperse Red 11), Violet Transforon U-BL
(C.I. Disperse Violet 23), Blue Transforon U-2R (C.I. Disperse Blue 19),
Blue Transforon U-B (C.I. Disperse Blue 3)

As usual, intermediate colours can be obtained by mixing.

The invention is described in more detail in the following non-limiting examples, in which the percentages of hexamethylphosphorotriamide are by weight with respect to the other solvents present.

EXAMPLE 1

In order to determine the solubility, the disperse dye Blue Catulia R$^R$ (P.C.U.K.) is dissolved in perchloroethylene and also in mixtures of perchloroethylene and hexamethylphosphorotriamide containing different precentages by weight of the latter product. The following solubility values are found:

pure perchloroethylene : solubility 3.1 g/l
perchloroethylene + 3% hexamethylphosphorotriamide : solubility 10 g/l -continued

| |
|---|
| perchloroethylene + 5% hexamethylphosphorotriamide : solubility 22 g/l |
| perchloroethylene + 10% hexamethylphosphorotriamide : solubility 8 g/l |

It can be seen that the addition of 5% hexamethylphosphorotriamide considerably increases the solubility of Blue Catulia R in perchloroethylene.

EXAMPLE 2

In order to determine the solubility of the disperse dyes Blue Catulia R and Violet Catulia R, each of the latter is dissolved in the mixtures obtained by adding/in each case 5% by weight of hexamethylphosphorotriamide (hereinafter called hexametapol) to methylene chloride, chloroform, carbon tetrachloride, trichloroethylene and perchloroethylene respectively. The following solubility values are found:

| solvent mixture | solubility g/liter | |
|---|---|---|
| | Blue Catulia R | Violet Catulia R |
| methylene chloride + 5% hexametapol | 25 | 22 |
| chloroform + 5% hexametapol | 49 | 50 |
| carbon tetrachloride + 5% hexametapol | — | 22 |
| trichloroethylene + 5% hexametapol | 32 | 33 |
| perchloroethylene + 5% hexametapol | 22 | 12 |

The solutions obtained are filtered and then injected into marker pens consisting of a body and cap made of polypropylene, a reservoir of crepe paper, and a tip of compressed nylon fibers. The marker pens thus obtained enable various designs to be drawn on a coated paper. After drying, these drawings give very good transfers to polyester fabric, the transfer being effected in a press at 200° C. for 30 seconds.

EXAMPLE 3

Disperse dyes of the Catulia brand are dissolved in a mixture of perchloroethylene and 5% hexametapol. The following solubility values are found:

| Dye | Solubility in g/liter |
|---|---|
| Yellow Catulia 2 J | 53 |
| Yellow Catulia 2 R | 63 |
| Orange Catulia 2 R | 85 |
| Red Catulia B | 22 |
| Red Catulia 2 B | 50 |
| Violet Catulia R | 12 |
| Blue Catulia 2 R | 35 |
| Blue Catulia R | 22 |
| Blue Catulia B | 32 |

The solutions are filtered and 3% by weight of ethylcellulose N 4 (Hercules) is added. The inks obtained are injected into felt tip pens having an aluminium body, polypropylene cap, reservoirs of cellulose fibre, and tips of compressed polyethylene fibres. The ageing behaviour of these pens is very good, and drawings having a clear outline and without blurred edges can be obtained on coated paper or tracing paper. After transfer at 200° C. for 30 seconds on polyester fabric, very full-bodied shades are obtained.

EXAMPLE 4

3 g of CAP 504-02 binder (Eastman Chemical International Company), followed by:
- 3.5 g of Blue Transforon U-2R (C.I. Disperse Blue 19)
- 1.4 g of Orange Transforon U-RL (C.I. Disperse Orange 25)
- 0.12 g of Yellow Transforon U-2GL (CI. Disperse Yellow 3)

are dissolved in 100 ml of a mixture of trichloroethylene and 5% hexametapol.

After filtration under pressure an ink is obtained which, when injected into a felt tip marker pen similar to those described in Example 2, enables drawings to be made on coated paper that transfer black on a polyester support.

EXAMPLE 5

3 g of ethylcellulose N4 (Hercules Company), followed by 2.5 g of Orange Catulia 2R and 2.5 g of Blue Catulia 2R are dissolved in 100 ml of a mixture of perchloroethylene and 5% of hexametapol.

After filtration under pressure, an ink is obtained which, when injected into a felt tip pen, enables drawings to be made on coated paper or on aluminium film that transfer a deep brown colour to a support of polyester fabric.

EXAMPLE 6

2% by weight of ethylcellulose N4 (Hercules Company) followed by 6 g of Blue Catulia 2R, 2 g of Blue Catulia B and 3 g of Orange Catulia 2R, are dissolved in 100 ml of a mixture consisting of one part by volume of trichloroethylene, one part by volume of perchloroethylene and 6% of hexametapol.

After filtration under pressure, an ink is obtained which, when injected into a felt tip pen, enables, deep black drawings to be obtained on polyester fabric from tracing paper as intermediate support.

I claim:

1. A dye solution consisting essentially of one or more sublimable, water insoluble dyes capable of use in transfer printing, one or more liquid aliphatic hydrocarbons having 1 to 3 carbon atoms and in which at least one hydrogen atom is substituted by chlorine, and hexamethylphosphorotriamide in an amount of between 2 and 10% by weight of the liquid aliphatic hydrocarbon .

2. A dye solution according to claim 1 wherein the liquid aliphatic hydrocarbon is selected from the group consisting of methylene chloride, chloroform, carbon tetrachloride, 1,1,1-trichloroethane, sym.-dichloroethane, trichloroethylene, perchloroethylene, and 1,2,3-trichloropropane.

3. A dye solution according to claim 1 wherein the dye is selected from the group consisting of dyes having a sublimation temperature between 150° and 225° C.

* * * * *